INVENTOR
HARVEY E. MILLER
BY James A. Lucas
ATTORNEY

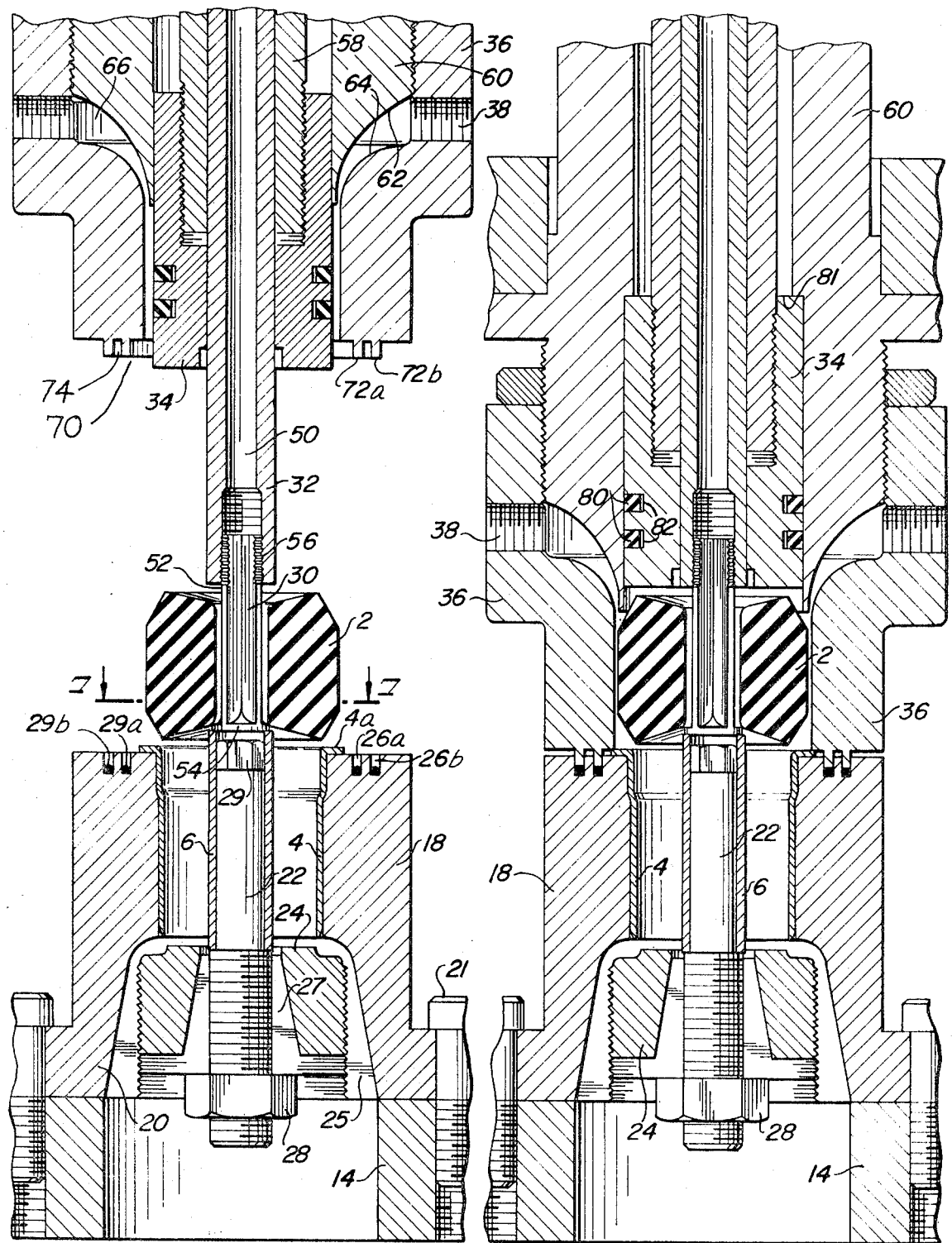

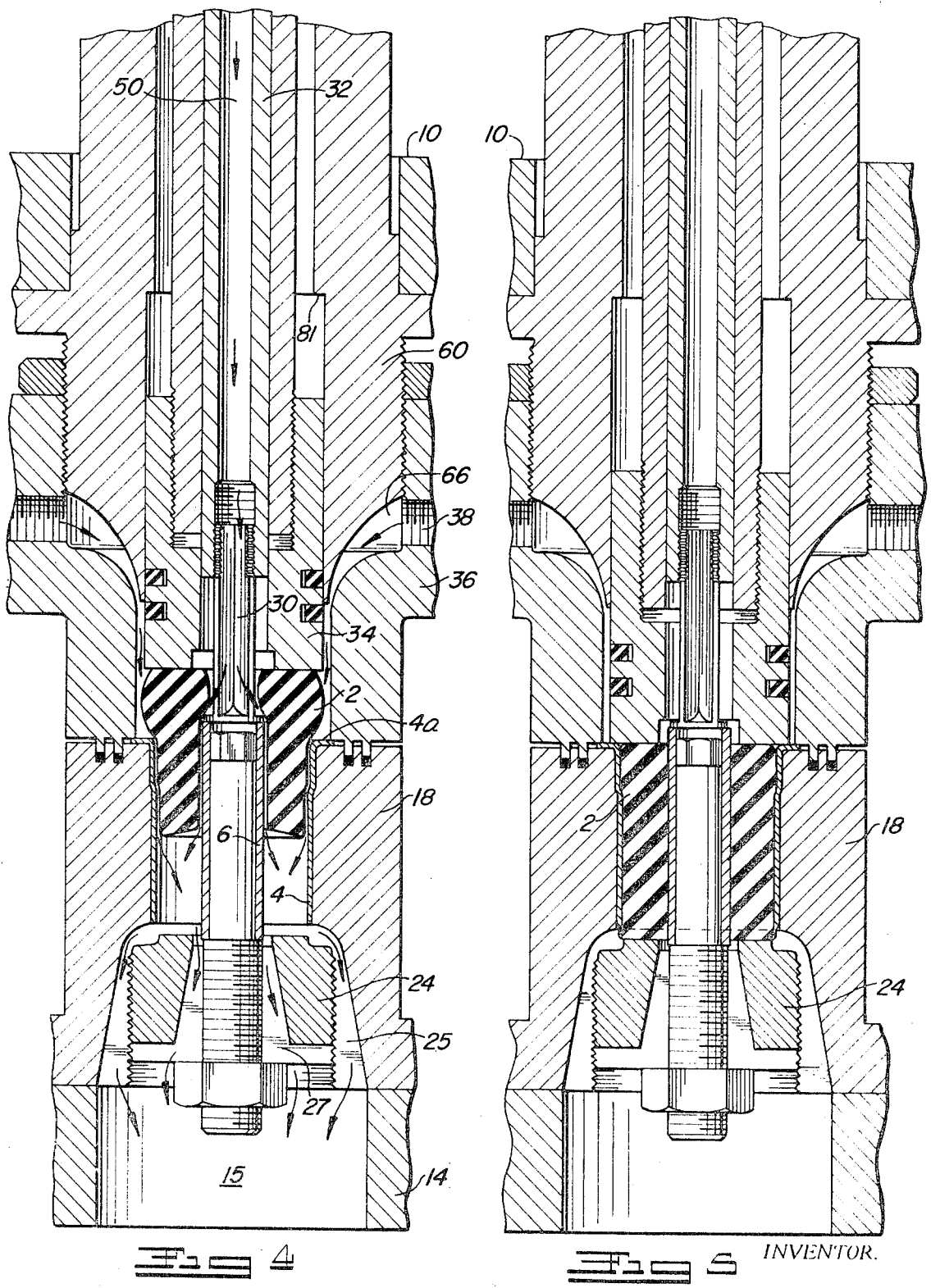

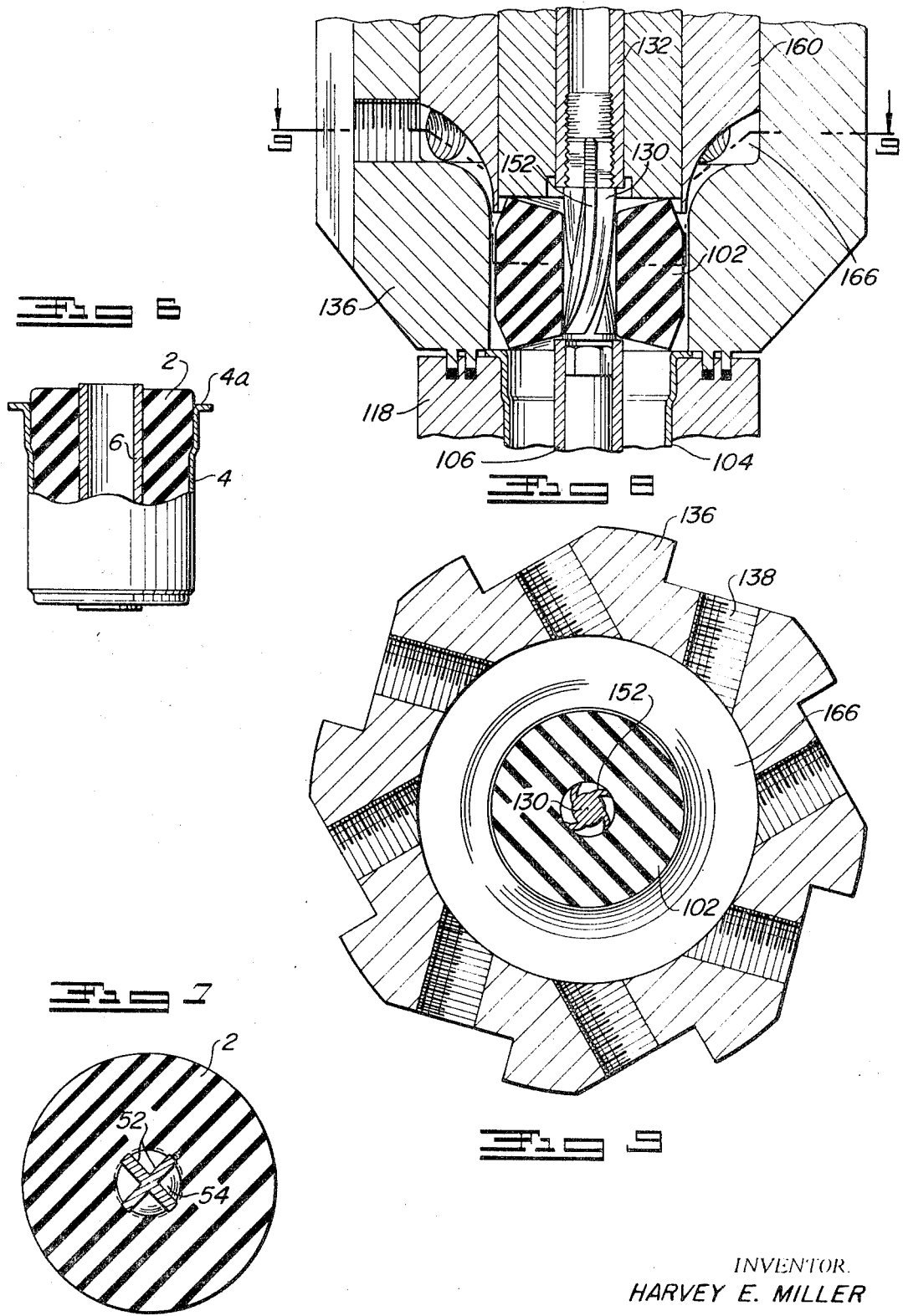

United States Patent Office 3,588,979
Patented June 29, 1971

3,588,979
BUSHING ASSEMBLY MACHINE AND METHOD
Harvey E. Miller, Logansport, Ind., assignor to The General Tire & Rubber Company
Filed Aug. 28, 1969, Ser. No. 853,902
Int. Cl. B23p *11/00, 11/02, 19/02*
U.S. Cl. 29—149.5NM
21 Claims

ABSTRACT OF THE DISCLOSURE

Resilient annular bushings of the type comprising a molded elastomeric insert radially compressed between two concentric sleeves are assembled without the use of conventional petroleum or mineral base lubricants by the use of air or other gaseous medium as the lubricant. The insert is placed on a fluted spindle and is enclosed in a confined chamber after which high pressure air through the spindle and around the insert supplies lubrication as the insert is forced between the two concentric sleeves. The bushing is ready for use immediately after assembly.

BACKGROUND OF THE INVENTION

Bushings of the type utilizing a molded elastomeric insert between a pair of rigid concentric sleeves have been employed for many years to isolate noise and vibration while permitting relative movement between two component parts. Typically, one sleeve is connected to one of the component parts while the other sleeve is joined to the other part. Relative movement between the parts is transmitted through the elastomeric insert. The insert is held under appreciable radial compression between the sleeves and exerts a force against the sleeves, said force serving to prevent slipping between the insert and the sleeves. The load bearing properties of the bushing can be further improved by bonding the insert to one or both of the sleeves. A large number of bushings of this type are used as engine mounts, and in the steering mechanism and spring suspension of vehicles such as automobiles.

Several types of machines have been developed for the assembly of bushings of this type. These machines typically use a floating or a stationary mandrel, and a tapered cylinder for forcing the inner sleeve into the annular insert and the insert into the outer sleeve. Because of the friction between the sleeves and the insert during assembly, a substantial amount of lubricant such as petroleum or mineral oil, is required to assist in the fabrication. The presence of the lubricant, however, is undesirable. It reduces the frictional resistance between the insert and sleeves, which resistance is necessary for the proper functioning of the assembled bushing, particularly under high radial, axial and torsional loads. To overcome this problem, the bushing must be aged for several days before use to permit absorption of the lubricant by the elastomeric insert. The use of a lubricant presents other problems as well, including the additional cost of the lubricants, the messiness associated with their use and the safety hazards created when lubricants are spilled or splashed on the floor and equipment.

SUMMARY OF THE INVENTION

It is an object of the present invention to eliminate the use of liquid lubricants of the type previously used in the assembly of resilient bushings.

Another object is the use of air as a lubricant during the fabrication of annular bushings.

Yet, another object of the invention is a machine which can be used to quickly assemble a molded annular rubber insert between a pair of concentric rigid sleeves using an air film as a lubricant.

BRIEF DESCRIPTION OF THE DRAWINGS

These and other objects are accomplished in the manner to be hereinafter described with reference to the drawings in which:

FIG. 2 is a cross-sectional elevation showing the details of the machine during the first phase of the assembly operation;

FIG. 3 is a cross-sectional view showing the assembly ram pressing against the rubber insert during the next phase of the assembly operation;

FIG. 4 is a cross section showing the insert partially assembled between the sleeves;

FIG. 5 is a cross section showing the insert completely assembled;

FIG. 6 is a partial cross-sectional view of the completely assembled bushing;

FIG. 7 is a cross-sectional view taken along lines 7—7 of FIG. 2;

FGI. 8 is a partial cross-sectional elevation of the assembly machine showing a modified air-flow arrangement; and FIG. 9 is a cross-sectional view taken along lines 9—9 of FIG. 8.

DETAILED DESCRIPTION OF THE INVENTION

Figure 1:
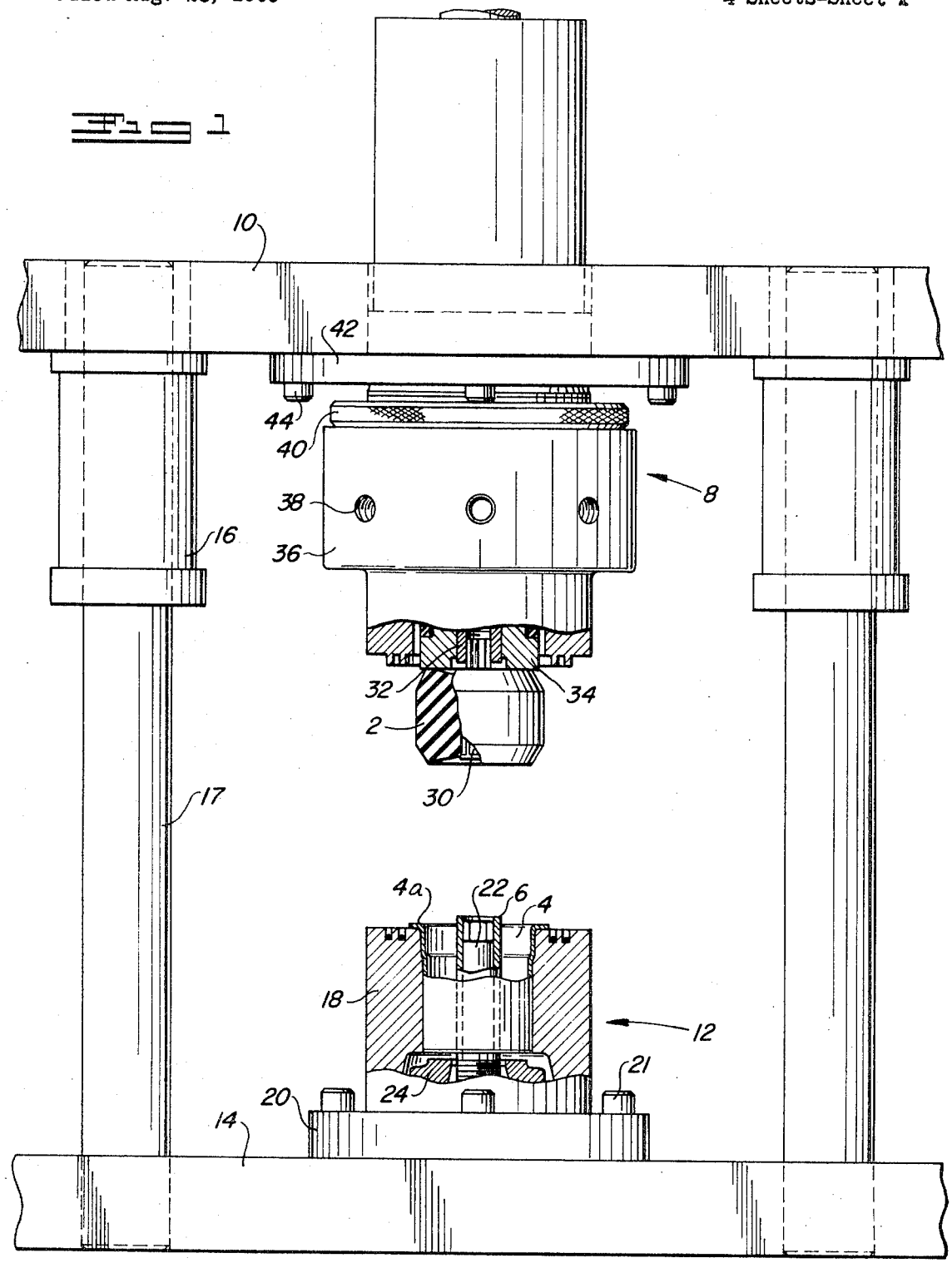
FIG. 1 is an elevation view partially in cross section of a principal portion of a bushing fabrication machine, showing the position of the component parts of the bushing before assembly.

This invention relates to a method and apparatus for the fabrication of resilient elastomeric bushings, wherein a film of air is used as a lubricant to assist in the assembly of the molded rubber insert between the two rigid sleeves. During assembly, the two sleeves are supported in concentric relationship with respect to one another, and the insert is forced axially between the sleeves while introducing a gaseous medium such as air under high pressure between the surfaces of the sleeves and those of the insert.

For a more detailed explanation of the invention reference is made to FIG. 1 of the drawings wherein the components of a bushing, namely an elastomeric insert 2, an outer metal sleeve 4 and an inner metal sleeve 6 are manually or otherwise positioned in the machine of the present invention before assembly. For purposes of clarity various structural details of the complete assembly machie including controls, cylinders, air compressors, hoses and pumps have been omitted. The machine is composed of an upper assembly 8, supported on an upper die plate 10, and a lower assembly 12, supported on a lower die plate 14. The upper die plate is mounted on annular bushings 16 slidable on circular die posts 17 for movement of the upper assembly 8 toward or away from the lower assembly 12. The lower assembly 12 comprises a nest 18 having a flange 20 secured to the lower plate 14 by bolts 21. Within the nest 18 is a vertically extending post 22. The outer bushing sleeve 4 is positioned within the nest as determined by flange 4a of the sleeve. The inner bushing sleeve 6 is positioned on post 22. Beneath the two sleeves is an insert stop 24 which serves to limit the downward movement of the rubber insert 2 during the assembly operation.

The upper assembly 8 comprises a fluted spindle 30 on which the insert 2 is frictionally held. The spindle is connected to a piston rod 32 joined to a first fluid cylinder (not shown) above the upper die plate 10. This first piston rod 32 slides within a ram 34 contacting the upper axial face of the insert 2. This ram is connected to a second rod joined to a second fluid cylinder also above upper die plate 10. Surrounding the ram 34 is a guide seal 36 containing a plurality of threaded inlets 38 to which are connected a plurality of high pressure air hoses (not shown). The guide seal 36 is held in place by lock ring 40. The whole assembly is attached to the upper die plate by mount flange 42 and bolts 44.

FIGS. 2–5 show further details of the upper and lower machine assembly and also show the sequence of shooting or assembling a bushing. As previously mentioned, the insert 2 is frictionally held on the fluted spindle 30. The upper end of the spindle has threads 56 by which it is secured into the bottom of piston rod 32 containing an annular passageway 50 therein. The spindle contains a plurality of splines 52 which are clearly shown in FIG. 7. The lower end of the spindle is in the shape of a disc 54, the diameter of which is larger than the inner diameter of the inner sleeve 6. The spindle piston rod 32 is connected to a first hydraulic or pneumatic cylinder and slides within ram 34 threaded to a second piston sod 58 connected to a second hydraulic or pneumatic cylinder.

As previously mentioned the guide seal 36 contains a plurality of air inlets 38. A flanged collector 60 is threaded to the guide seal. This collector has a concave surface 62 which cooperates with annular surface 64 of the guide seal, and communicates with the air inlet 38 to form an annular air passage 66. The collector 60 and guide seal 36 are axially movable with respect to the second piston 58 and ram 34.

The bottom surface 70 of the guide seal 36 contains a pair of annular projections 72a, 72b separated from one another by a groove 74.

The lower assembly 12 comprises a nest 18 having a pair of grooves 26a, 26b on its upper surface opposite the projection 72a, 72b of guide seal 36. In each groove is an O-ring 29a, 29b. As previously stated the nest 18 is secured to the bottom die plate 14 by a flange 20 and bolts 21. Insert 24 is threaded into the bottom of the nest 18 and is provided with a threaded hole extending axially therethrough. Circular post 22 on the inner sleeve is threaded through this axial hole and is secured in place by a hexagonal nut 28 threaded on the end thereof. The top of the circular post 22 is provided with a hexagonal head 29 to permit the use of a conventional wrench to secure the post into place. The vertical height of the post can be easily adjusted by loosening the nut 28 and rotating the post clockwise or counter clockwise to lower or raise the post. In like manner the insert stop can be adjusted upward or downward by rotation of the same within the nest.

A plurality of exhaust slots 25 are provided in the nest 18 around the stop 24 and additional slots 27 are located in the insert stop 24, around the post 22.

As seen in FIG. 2 the piston rod 32 has been moved downwardly by its cylinder thereby bringing the spindle 30 down into contact with the end of the inner sleeve 6. This serves to position the insert above and in close proximity to the inner and outer sleeves.

In the next phase of the assembly operation, the upper die plate 10 slides on die posts 17 toward the lower die plate 14 to bring the guide seal 36 into position for shooting the insert between the sleeves. The guide seal 36 continues on down until the annular projections 72a, 72b register with the grooves 26a, 26b in nest 18 and form a seal with O-rings 29a, 29b disposed in said grooves. As the guide seal moves down, the collector slides down around the ram to form an airtight seal therewith assisted by the two seal rings 80 made out of polytetrafluoroethylene or the like. On the interior surface of the collector is a shoulder 81 which contacts the top of the ram and carries the ram down into position immediately above the insert.

The inner sleeve 6 is securely held in place by the spindle 30 and the outer sleeve is held by guide seal 36 to resist axial movement and misalignment of the sleeves during shooting of the insert. Further, an airtight seal is formed above the insert.

In the shooting sequence shown in FIG. 4, the hydraulically or pneumatically operated ram 34 pushes the insert 2 between the two sleeves 4, 6 at the same time that high pressure air is introduced into the annualr passageway 50 through the piston rod 32 and then through the fluted spindle 30 to float the insert onto the inner sleeve 6, and additional high pressure air is introduced into the inlets 38 in the guide seal 36, through the annular chamber 66 surrounding the insert to compress the insert into the outer sleeve. The arrows in FIG. 4 show the direction of the high pressure air as it passes around the insert and out through the exhaust vents 25, 27 and hole 15 in the bottom die plate 14.

The ram 34 continues its downward movement forcing the insert between sleeves 4, 6 until the ram contacts the flange 4a of the sleeve as shown in FIG. 5. In the meantime the insert 2 continues to move between the sleeve until it contacts the stop 24 spaced a slight distance axially away from the end of the outer sleeve 4. Suitable mechanical or electrical means may be used to halt the movement of the ram at the bottom of the stroke. It is not necesary for the ram to contact the sleeve flange 4a. Instead the ram may be stopped a short distance from the flange.

At the termination of the shooting step the upper die plate 10 is retracted to its raised position after which the completely assembled bushing is removed from the nest 18.

The assembled bushing comprising the elastomeric insert between the inner sleeve 6 and the outer sleeve 4 is seen in FIG. 6. The inner sleeve is typically fabricated of rolled steel while the outer sleeve is preferably stamped out of tube stock or the like. One or the other of these can be made out of rigid plastic if desired. The insert 2 is typically formulated from a suitable elastomer such as natural rubber, chloroprene, butyl rubber or styrene-butadiene rubber appropriately combined with reinforcing agents and fillers such as carbon black, and other additives such as accelerators, retarders, curing agents and various antigradants.

A flanged-end bushing of the type shown in FIG. 6 using a molded chloroprene rubber insert having a durometer hardness of 53 was assembled according to the present invention as follows:

The holddown spindle was connected to the piston rod of a 2½ inch air cylinder having a 5" stroke and the ram was connected to the rod of a 8" cylinder having a 9" stroke, both cylinders operating on 90 p.s.i. air. The outer and inner metal sleeves were positoned in the nest and on the post respectively and the insert was placed on the spindle. At the start of the shooting cycle the spindle moved down into contact with the inner sleeve. About 0.3 second later the upper die plate moved down carrying the guide seal into sealing register with the nest. About 1.5 seconds after the start of the cycle, the ram cylinder was actuated to bring the ram into contact with the insert. Simultaneously, air at 450 p.s.i was introduced through the inlets in the guide seal and around the annular space surrounding the insert and air at 900 p.s.i. was introduced through the spindle to provide a film on which the insert traveled as it was forced into place by the ram. The high pressure air was left on for about 1.4 seconds after which the pressure on the ram was cut off. The upper die plate and the spindle were then withdrawn and the bushing was manually removed from the machine.

The bushing was immediately placed in a life test machine. In this test machine the outer sleeve was held stationary while the inner sleeve was rotated through an are of 52° at 250 cycles per minute under an applied static load of 1200 lbs. The bushing failed at 706,500 cycles, a very acceptable value for a bushing of this type.

Several rubber inserts having the same dimensions as before but with a durometer hardness of 67 were successfully assembled using the same timing sequence. However, air pressures of 2200 to 2400 p.s.i. were used to provide an air film between the insert and the outer sleeve and pressures of 1450–1600 were used to provide a lubricant film around the inner sleeve.

Bushings can be successfully shot following the teachings of the present invention using air pressures as low as about 250 p.s.i. or as high as 3,000 p.s.i. or more, depending upon the factors such as hardness and composition of the rubber compound, the smoothness of the sleeves, the size of the bushing, and the speed and pressure of the ram. Furthermore, the various timing sequences and intervals can be varied without departing from the teachings of the invention. Although the high pressure air was left on about 1.7 seconds in the above example, times as short as 1 second or less can be successfully used.

Although 90 p.s.i. air pressures were used in the air cylinders that operate the hold down cylinder and the ram, it is contemplated that higher air pressures of 200 p.s.i. or above will be used. These higher air pressures help to speed up the assembly operation and assist the guide seal and spindle in holding the two sleeves while the insert is being shot using the high pressure air. Appropriate means can be provided to bleed some of the high pressure shooting air into these cylinders to increase the cylinder pressure. Alternatively, these cylinders can be operated hydraulically rather than pneumatically, thus, minimizing the amount that the two sleeves will bounce during shooting. Mechanical means can also be used to secure the spindle, sleeves and guide seal against bouncing if necessary.

The pressure of the air that is needed as a lubricant for the assembly varies nonlinearly with the hardness of the rubber in the insert. Because a hard rubber insert requires more radial force to compress it than is required for a soft rubber insert, a higher air pressure is required to establish and maintain a sliding air film for the hard insert than for the soft insert.

Various modifications can be made in the teachings of the present invention without departing from the scope thereof. One such modification is shown in FIGS. 8 and 9 wherein means are provided for swirling the high pressure air to stabilize and prevent coking of their insert during shooting. In FIG. 8 is shown the guide seal 136 forming an air-tight seal with nest 118, and the insert 102 on spindle 130 disposed immediately over the inner sleeve 106 and outer sleeve 104. Spindle 130 is threadedly joined to tubular rod 132 in the same manner as previously described. An annular chamber 166 is formed between collector 160 and guide seal 136.

The splines 152 of the spindle 130 are curved through an arc of about 90° to effectively swirl the air helically as it flows down through the spindle and through the insert. The air inlets 138 in the guide seal are arranged generally tangentially around the guide seal. This serves to swirl the incoming high pressure air around the chamber 166 and around the insert 102.

Other modifications can be made in the teachings of the present invention without departing from the scope thereof. For example, various changes can be made in the timing sequence without adversely effecting the ability of the machine to assemble bushings as herein described. For instance, the ram can be activated to force the insert between the sleeves shortly after introduction of high pressure air rather than simultaneously therewith as described. Furthermore, it is not essential for the air to be introduced around the outer sleeve simultaneously with the air introduced around the inner sleeve. These may be sequenced together and may be fed from a common source. Further where lubrication would not normally be required along the surfaces of both sleeves, air can be introduced along one sleeve only. Furthermore, it should be noted that the assembly can be carried out sequentially rather than concurrently, i.e., the insert can be assembled on to one sleeve followed by complete assembly of the subassembly into or onto the other sleeve.

The flow rate of air around the rubber insert is generally less than about 10 cubic feet per second and can be as low as about 1 cubic foot per second depending upon the size of the bushing and the hardness of the insert.

In place of air other gaseous means, such as nitrogen or the like, can be used as a lubricant film around the insert.

These and other modifications can be made in the teachings of the present invention without departing from the scope which is delimited by the claims appended hereto in which I claim:

1. A method for assembling an annular elestomeric bushing composed of a molded elastomeric insert radially compressed between inner and outer rigid concentric sleeves, comprising positioning the outer sleeve around the inner sleeve, and thereafter forcing the insert axially between the sleeves while establishing a film of gaseous lubricant between the surfaces of the sleeve and the insert.

2. The method according to claim 1 wherein the film of gaseous lubricant is introduced between the surfaces in the same axial direction as the insert.

3. The method according to claim 2 wheretin the gaseous lubricant is introduced at a pressure of between about 250 p.s.i. and about 3000 p.s.i.

4. The method according to claim 2 wherein the gaseous lubricant is introduced between the surfaces at a volume flow rate of between about 1 and about 10 cubic feet per second.

5. The method according to claim 1 wherein a first stream of gaseous lubricant is introduced between the insert and the outer sleeve and a second stream of gaseous lubricant is introduced between the insert and the inner sleeve.

6. The method according to claim 5 wherein the gaseous lubricant introduced between the insert and outer sleeve is swirled tangentially between the surfaces.

7. The method according to claim 5 wherein the lubricant introduced between the insert and the inner sleeve is swirled helically between the surfaces.

8. A method of assembling a molded annular elastomeric insert between outer and inner concentric sleeves wherein the thickness of the insert as molded is greater than the space between the sleeves, comprising:
    (a) Positioning the inner and outer sleeves concentrically with respect to one another,
    (b) Axially forcing the insert between the two sleeves,
    (c) Introducing high pressure air
        (1) Through the annulus of the insert to expand the insert around the inner sleeve, and
        (2) Around the outside of the insert to compress the insert into the outer sleeve, and
    (d) Venting air from around and within the insert as the insert is forced into place.

9. The method according to claim 8 wherein the air is introduced through and around the insert at a pressure of between about 250 p.s.i. and 3000 p.s.i. and at a flow rate of between about 1 and about 10 ft.³/sec.

10. An apparatus for assembling an annular elastomeric bushing of the type comprising a molded insert assembled between a pair of rigid concentric sleeves, comprising a support for the inner sleeve, a nest for positioning the outer sleeve concentrically with respect to the inner sleeve, means for axially forcing the insert between the inner and outer sleeves and means for establishing a gaseous film along the surfaces of the inner and outer sleeves during the assembly of the insert therebetween.

11. The apparatus according to claim 10 wherein the support for the inner sleeve comprises a post within said nest.

12. The apparatus of claim 11 wherein the means for axially forcing the insert between the sleeves comprises a ram joined to a first fluid actuated cylinder.

13. The apparatus of claim 11 wherein the means for establishing the gaseous film comprises a source of high pressure air, a fluted spindle and an annular chamber surrounding the insert.

14. The apparatus according to claim 13 wherein one end of the spindle is joined to a rod which in turn is connected to a second fluid actuated cylinder while the other end of the spindle terminates in a surface having a larger cross-section than the inner diameter of the inner sleeve and is movable into contact with the end of the inner sleeve to hold the same in place.

15. The apparatus according to claim 14 further including stop means associated with the inner sleeve support post for limiting the extent of axial movement of the insert with respect to the sleeves.

16. The apparatus of claim 15 further including vent means around the support and the stop means for the high pressure air.

17. An apparatus for producing a resilient bushing by the assembly of a molded rubber insert between inner and outer sleeves wherein the wall thickness of the molded insert is greater than the distance between the sleeves comprising:
  (a) Support means for holding the two sleeves in axial alignment with respect to one another,
  (b) A spindle for holding the insert, joined to a source of high pressure air and movable axially toward and away from the two sleeve support means and into contact with one end of the inner sleeve,
  (c) Seal means axially movable toward the outer sleeve support means to form therewith a passageway around the outside of the insert and the inside of the outer sleeve, and
  (d) Means joining said passageway to a source of high pressure air,
  (e) Means to force the insert in an axial direction around the inner sleeve and into the outer sleeve, and
  (f) Means to introduce high pressure air through and around the insert to provide lubrication to assist in assembly.

18. The apparatus according to claim 17 wherein the means for holding the two sleeves in axial alignment comprises a nest for the outer sleeve, and a post for the inner sleeve.

19. The apparatus according to claim 18 including means for holding the two sleeves in axial alignment comprising an insert stop positioned at one end of the nest, said inner metal post being joined to said stop.

20. The apparatus according to claim 19 wherein the spindle is fluted and is joined to an annular piston rod connected to a source of high pressure air.

21. The apparatus according to claim 20 wherein the seal means comprises an annular guide seal and means for moving the guide seal into fluid tight communication with the outer sleeve nest and with the insert pushing means.

References Cited

UNITED STATES PATENTS

| | | | |
|---|---|---|---|
| 1,739,270 | 12/1929 | Thiry | 29—149.5 |
| 1,961,536 | 6/1934 | Thiry | 29—149.5 |

THOMAS H. EAGER, Primary Examiner

U.S. Cl. X.R.

29—235, 450

PO-1050
(5/69)

UNITED STATES PATENT OFFICE
CERTIFICATE OF CORRECTION

Patent No. 3,588,979  Dated June 29, 1971

Inventor(s) H. E. Miller

It is certified that error appears in the above-identified patent and that said Letters Patent are hereby corrected as shown below:

Column 2, line 23, "FGI. 8" should be -- FIG. 8 --. Column 3, line 17, "sod" should be -- rod --. Column 4, line 69, "are of 52°" should be -- arc of 52° --. Column 6, line 22, "wheretin" should be -- wherein --. Column 8, line 11, "means for holding the two sleeves in axial alignment com-" should be -- means for limiting the axial movement of the insert com- ---.

Signed and sealed this 25th day of January 1972.

(SEAL)
Attest:

EDWARD M. FLETCHER, JR.
Attesting Officer

ROBERT GOTTSCHALK
Commissioner of Patents